INVENTORS.
EDWARD SCHASCHL
BY GEORGE G. BERNARD

ATTORNEY

United States Patent Office 3,155,533
Patented Nov. 3, 1964

3,155,533
METHOD OF TREATING GLASS WOOL
WITH POLYSILOXANES
Edward Schaschl and George G. Bernard, Crystal Lake,
Ill., assignors to The Pure Oil Company, Chicago, Ill.,
a corporation of Ohio
Filed Sept. 10, 1959, Ser. No. 839,257
9 Claims. (Cl. 117—54)

This invention is directed to an apparatus for evaluating the static-electricity-dissipation characteristics of liquids. In a more specific aspect, this invention is directed to an improved device for generating static electricity. In another aspect, this invention is directed to a specially-treated material for generating and collecting static electricity.

It is known that many liquids, and especially inflammable hydrocarbons, build up great charges of static electricity. This static electricity is generated by friction between moving liquid layers, and where the liquid is a very poor conductor of electricity, static charges of great magnitude accumulate. Such charges are eventually dissipated by electric arc to the side of the container, or to other grounded structures.

It is known that electric sparks produced by static electricity present a great fire hazard. Where the liquid being stored is an inflammable hydrocarbon, the probability that an electric spark will produce a fire is very great. It is known that some hydrocarbons have higher electrical conductivities than others, and that the danger of fire is greatly reduced where the conductivity of the hydrocarbon is increased.

The art teaches the use of certain additives to increase the conductivity of hydrocarbons. Such additives are expensive, and also act as impurities in the hydrocarbon to which they have been added. It is therefore desirable that the minimum amount of such additive be employed to increase the conductivity of the hydrocarbon to the lowest safe limit. In order to determine the effectiveness of various additives, and to determine when such additives are required and in what amounts they must be used, it is necessary to measure the static-electricity-dissipation characteristics of the liquid under study. For safe handling or storage, a fluid must be sufficiently conductive to static electricity to eliminate the danger of spark-discharge.

It is an object of this invention to provide an apparatus for measuring the static-electricity-dissipation characteristic of liquids.

Another object of this invention is to provide a stable static-electricity-generation device capable of repeatedly producing standard quanta of static electricity.

Yet another object of this invention is to provide a specially-treated glass wool for use in a fluid-circulating, static-electricity-generation system.

Still another object of this invention is to provide a method for preparing a specially-treated glass wool capable of repeatedly producing and collecting standard quanta of static electricity when a fluid is flowed through the glass wool at a given rate.

Briefly, the apparatus of this invention for measuring the dissipation of static electricity comprises a liquid-re-circulating, static- electricity-generating system, including a reservoir, a variable-capacity pump, a column packed with specially-treated glass wool, and connecting piping; a static-charge-collecting system, including a charge-collecting electrode positioned in contact with a column of treated glass wool packing, and an electroscope connected to the charge-collecting electrode and adapted to make contact with ground to dissipate the accumulated static-electricity charge when the potential becomes sufficiently great; and a sample-containing vessel in which are disposed two electrodes, these electrodes being connected between the input to the electroscope and ground.

Figure 1:
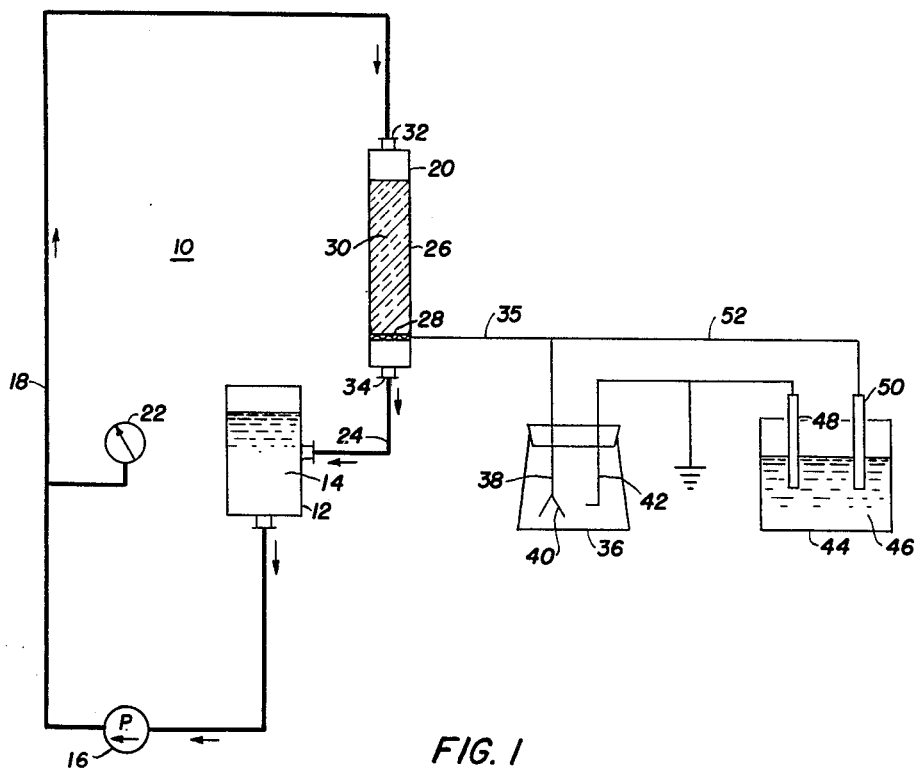
FIGURE 1 is a diagrammatic illustration of the static-electricity-generating apparatus embodying one aspect of the invention.

Referring to FIGURE 1, static electricity-generating system 10 comprises fluid reservoir 12 which contains circulating fluid 14. Variable-capacity pump 16 is adapted to draw fluid from reservoir 12 at any desired rate or pressure. Pump 16 forces the fluid to circulate through line 18 to static-electricity-generating chamber 20. Meter 22, which is preferably a pressure gauge, may be any suitable means for measuring the output of pump 16. Thus, meter 22 may be a gauge adapted to measure the outlet pressure from the pump, a flow-gauge adapted to measure the volumetric rate of discharge of the pump, or may be an electric-power-measuring meter which measures the power input to the motor which drives pump 16. All these devices provide alternative methods for measuring the output of pump 16, but a simple pressure gauge is preferred. Flow-line 24 provides a return from the outlet of static-electricity-generating chamber 20 to liquid receptacle 12. Thus, pump 16 drives fluid in a continuous cycle through the system.

Static-electricity-generating chamber 20 includes a chamber shell, 26, of which at least the interior surface consists of an electrically-insulating material. An electrical conductor, 28, is disposed within vessel 26 and cooperates with the vessel to support a column of specially-treated glass wool, 30. In passing from inlet 32 to outlet 34 of the static-electricity-generating chamber, the fluid must flow through specially-treated glass wool 30, and the friction between the fluid and the glass wool produces a charge of static electricity on the glass wool. This static electricity is conducted away by means of electrode 28 which is connected to the inlet of electroscope 36 by conductor 35.

Electroscope 36 includes an input electrode, 38, which is equipped with two foil-like leaves, 40. The electroscope is of conventional design and includes ground electrode 42, which is electrically connected to a ground. Liquid receptacle 44 contains a quantity of fluid, 46, whose static-electricity-dissipation characteristic is to be studied. Supported within vessel 44 are electrodes 48 and 50. Electrode 48 is connected to ground, and electrode 50 is connected by means of conductor 52 to the input of electroscope 36.

It is thus apparent that the apparatus of this invention comprises two major parts, the static-electricity-generation system, which comprises the elements having reference numerals below 35, and the liquid-receptacle system for measuring the dissipation of static electricity, which consists of elements having reference numerals greater than 35. A hydrocarbon liquid circulated through static-electricity-generating system 10 generates static electricity on the glass wool packing at a rate proportional to the rate of liquid flow. This generated static electricity accumulates on electrode 28, which is preferably fabricated from a screen, and is transmitted to foil-like leaves 40 depending from electrode 38 of electroscope 36. As leaves 40 spread apart, the right-hand leaf comes into contact with grounded electrode 42, whereupon the accumulated static charge is dissipated to ground and the leaves of the electroscope fall together. This charging and discharging continues at a rate proportional to the rate at which static electricity is generated within the circulating liquid of system 10, and can be altered simply by changing the discharge rate from pump 16.

The liquid-receptacle system provides a second, parallel path through which the static electricity can drain to ground. It is apparent that the rate at which static electricity can drain via this route is dependent upon the conductivity of the sample contained in receptacle 44 between electrodes 48 and 50. Because the static-electricity-generating propensity of a hydrocarbon liquid is inversely proportional to the conductivity of the liquid, comparison of the conductivities of the various liquids, or of a single liquid with and without an additive, is equivalent to a comparison of the actual static-electricity-accumulation tendency of the samples. Liquids which dissipate static-electricity poorly provide very little conductivity between electrodes 48 and 50.

The operation of the apparatus of this invention is readily apparent. Vessel 44 is filled with a sample of the liquid to be evaluated. A second standard liquid is circulated through static-electricity-generating system 10 by means of pump 16. Pump 16 may be adjusted to a preselected output, and the rate at which leaves 40 of electroscope 36 spread apart to contact grounded electrode 42, and discharge the accumulated static electricity, can be measured. Discharging rate will vary inversely with the conductivity of the test sample to be evaluated. It is preferred, however, to circulate liquid in the static generating system and adjust the flow rate, thereby also altering the pressure indicated on gauge 22, until a flow rate and generating rate is established at which the right-hand leaf of the electroscope just fails to touch grounded electrode 42, or at which the leaves reach some other preselected angle of spread. The pressure indicated by gauge 22 under these conditions is noted. The attainment of this condition indicates that the conductivity of the test liquid is just sufficient to drain off the amount of static electricity being generated. It is evident that the pressure reading of gauge 22 under these equilibrium conditions is proportional to the static-electricity-dissipation capacity, or to the conductivity, of the test fluid.

A known amount of additive may be mixed with the test liquid, and the flow rate again adjusted until right-hand leaf 40 of the electroscope again just fails to touch the grounded electrode 42. The pressure indicated on gauge 22 is again noted and may be compared with the pressure reading obtained during the first test. The procedure may be repeated using other samples of test liquid containing other additives to be evaluated, or using various concentrations of the same additive. The accumulated data are indicative of the relative effectiveness of the additives.

Typical experimental data which have been obtained using the method and apparatus of this invention are set out in Table I. The pressure recorded in the circulating pressure at which the leaf of electroscope 36 just fails to touch the grounded electrode. This pressure was measured in pounds per square inch, and is inversely proportional to the conductivity of the test liquid.

*Table I*

| Liquid | Additive | Concentration, lb./1,000 bbl. | Pressure |
|---|---|---|---|
| Iso-octane | None | | 3.5 |
| Do | Shell ASA #1 | 1 | 13.5 |
| JP-4 Jet Fuel | None | | 2.0 |
| Do | Shell ASA #1 | 1 | 13.5 |
| Do | Du Pont SCA 100 | 1 | 2.5 |
| Do | do | 10 | 2.5 |

In order to obtain reliable data, it is necessary that the static-electricity-generation system be capable of accurately reproducing standard quanta of static electricity for a given flow rate, or pump-outlet pressure. It has been found that the success of the apparatus and method of this invention is dependent upon the characteristics of the glass-wool packing material used in the static-electricity-generation chamber, and is also dependent upon the characteristics of the circulating liquid. When commercially-obtained glass wool was used in combination with iso-octane as the circulating liquid, and with sample receptacle 44 empty, the charging rate initially was sufficient to cause the electroscope leaves to charge and discharge in 5.7 seconds at a circulating pressure of 40 p.s.i.g., as measured by gauge 22. However, after about 1 hour of circulation, the charging rate slowed to a level of 1 discharge every 9.4 seconds. It was also found that contamination of the iso-octane by minute quantities of water completely stopped the accumulation of static electricity, and that the glass wool cannot be regenerated by washing with an oil and water solvent, such as acetone. Because it is essential that the charging rate remain constant during comparative evaluation of test liquids, it is necessary that the packing material be capable of developing accurate and repeatable quanta of static electricity at a given flow rate.

Figure 2:
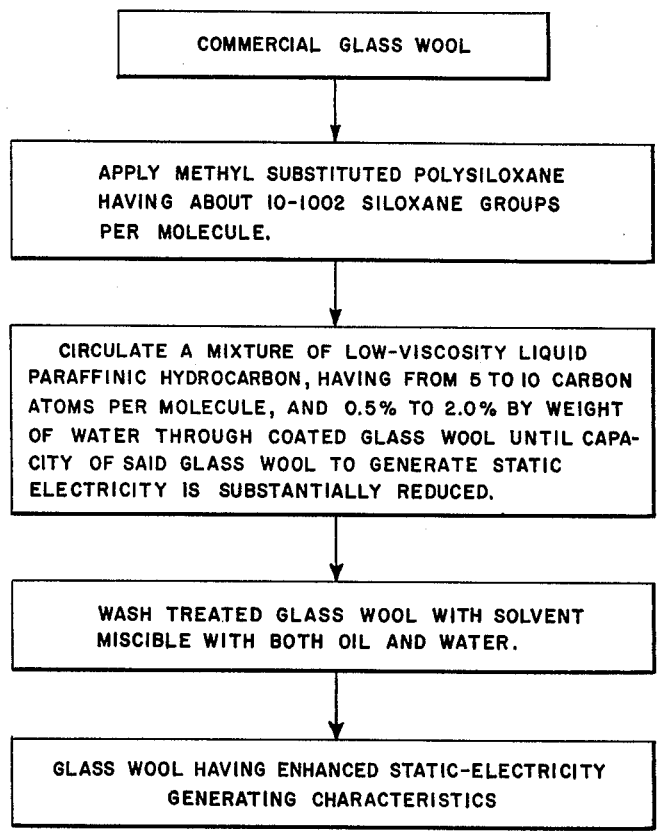
FIGURE 2 is a flow sheet showing the sequential treating steps of a glass wool to enhance its use in a static-electricity-generating apparatus.

It has been found, most unexpectedly, that a specially-treated, glass-wool packing is capable of producing static electricity at greatly increased rates, and with a high degree of accuracy and repeatability. This is especially so when the packing material is used with a special circulating liquid. It has been found, that to provide enhanced static-electricity-accumulation rates and continuing repeatability of results, the glass wool must be made oil-wettable by treatment with a silicone coating material. The glass wool must then be treated by flowing therethrough a hydrocarbon containing a small amount, between about 0.5% to 2%, of water. This treatment is continued until the silicone-coated glass wool shows substantially no capability for generating static electricity. The glass wool is then subjected to a third treatment which consists of washing the glass wool with a solvent which is miscible with both water and oil. The method steps of this treatment are depicted in the flow sheet designated FIGURE 2. Thereafter, when the circulating liquid is pumped through the treated glass wool, the charging rate remains constant for essentially unlimited time, and is much more rapid than before treatment.

Suitable treating materials which may be used in the first step of treatment to render the glass wool oil-wettable are organopolysiloxanes of the formula:

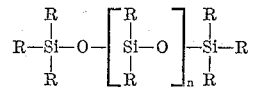

where each R is a methyl group, and $n$ is a number ranging from about 8 to 1000. The methyl-substituted polysiloxanes may contain minor amounts of chloro substituents. Thus, it is preferred that the substituent be a methyl group, but a minor number of the substituents, especially on terminal silicon atoms, may be chloro radicals, with no loss in effectiveness. The value of $n$ is not critical, but will determine the viscosity of the substituted polysiloxane. Where $n$ is about 10, the silicones are thin fluids. Where $n$ approaches 1000, the silicone fluids are extremely viscous. The value of $n$ is in no wise critical, but it is preferred to use silicone fluids having medium viscosities for ease of handling.

Methyl-substituted polysiloxanes are produced from methyl-chloro-silanes, which may contain 1 to 3 methyl groups. Typical is dimethyl-dichloro-silane, which on hydrolysis with water is believed to react as follows:

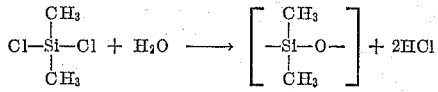

The dimethyl siloxane units polymerize to form chains of varying lengths. The hydrolysis of trimethyl-chloro-silanes produces a unit having a single unsatisfied valence, and supplies a blocking or terminal unit. On the other hand, methyl-trichloro-silanes hydrolyze to produce branch chain polymers. Hence, the nature and length of the chain may be determined by the number of chloro groups in the silane. Moreover, not all the chloro group may be hydrolyzed. Hence, the methyl-substituted polysiloxanes may contain some residual chloro radicals, specially on the terminal silicon atoms. Such methyl-substituted polysiloxanes may contain about 10–30% by weight of unhydrolyzed chloro substituents. Dimethyl-polysiloxanes are available commercially in a wide range of viscosities (chain lengths). Examples of suitable commerically available dimethyl polysiloxanes are Dow Corning 200 Fluids and General Electric Silicone Oils. Methyl-chloro-silanes are also available as Dow Corning DC–1208 and DC–1205 and General Electric SC–77 and SC–99.

When the glass wool is treated directly with dimethyl-polysiloxanes, as is preferred, the wool may be immersed directly in a low-viscosity silicone oil, but it is preferred to prepare a dilute solution (3–25%) of more viscous silicone oils in a hydrocarbon such as hexane, and immerse the glass wool therein. After immersion, the wool should be baked for not less than about half an hour at 150°–300° C. Other times and temperatures may be used. Alternatively, the glass wool may be treated by exposing the wool to the vapor of a methyl-chloro-silane. Since the wool invariably carries surface moisture, hydrolysis and polymerization occurs in-situ to produce an excellent coating.

Materials suitable for use in admixture with 0.5% to 2% of water in the second treatment step are liquid hydrocarbons having a relatively low viscosity, and more particularly paraffinic hydrocarbons having less than about 10 carbon atoms per molecule. Especially preferred is iso-octane. Various solvents which are miscible with both oil and water are used in the third treating step. Acetone is especially preferred as the oil-miscible, water-miscible solvent, but other materials, such as isopropyl alcohol, tertiary-butyl alcohol, propionaldehyde, propionic acid, and methyl ethyl ketone may also be used. The preferred circulating fluid comprises 10% by weight acetone, 0.5% water, and the remainder iso-octane. Other compositions, containing from 5% to 30% acetone, and from about 0.2% to 2% water, with the balance iso-octane, have been found to operate in a satisfactory manner. Other hydrocarbons, and especially the paraffins having about 5 to 10 carbon atoms per molecule, may be used instead of iso-octane.

As a specific example of the method of generating static electricity using the fluid-circulating system of this invention, the apparatus as depicted in the drawing and described in the specification was assembled, and a specially-treated glass wool was disposed in the static-electricity-generating chamber. This glass wool was prepared by treatment with General Electric silicone SC–87 to render the glass wool oil-wettable. This silicone oil is a methyl-substituted polysiloxane containing about 16–27% unhydrolyzed chlorine. A 5% solution of SC–87 silicone oil in hexane was prepared. The glass wool was dipped in this solution and thereafter baked at 200° C. for 3 hours. The silicone-treated glass wool was packed in the static-electricity-accumulation chamber. It was found that with this treatment alone, the charging rate again decreased as with fresh glass wool, thereby demonstrating the need for additional treatment. Next, the oil-wettable glass wool was treated by flowing therethrough iso-octane containing 1.0% by weight water. This liquid was circulated through the oil-wettable glass wool until the charging rate dropped to zero, after which the treatment was completed by washing the glass wool with acetone. Thereafter, a circulating liquid comprising about 10% acetone and about 0.5% by weight water, with the remainder being iso-octane, was used as the circulating fluid. When this circulating fluid was pumped through the specially-treated glass wool, the charging rate remained constant for an apparently unlimited time, and the rate of charge was greatly increased, only 0.31 second being required to completely charge the electroscope at a 40 p.s.i.g. pumping pressure. It will be noted that using conventional glass wool, a pumping pressure of 40 p.s.i.g. produced an initial electroscope charge rate of 5.7 seconds, which rate increased to 9.4 seconds after a lapse of 1 hour. It is evident that the enhanced result obtained by using the method and apparatus of this invention is dependent upon the special treatment of the glass wool, and upon the use of a suitable circulating liquid in conjunction with the specially-treated glass wool.

As another specfic example of the preparation of glass wool according to this invention, a commercial glass wool is immersed in a fluid dimethyl polysiloxane having a viscosity of 1 centistoke, the glass wool is removed and baked for ½ hour at 250° C. After baking, the glass wool is treated by flowing therethrough a liquid consisting of mixed acyclic hydrocarbons containing 5 to 9 carbon atoms, predominantly pentanes and hexanes, and 1% by weight of water for a period of 3 hours. The wool is then washed by agitation in tertiary butyl alcohol for five minutes.

As another example of the preparation of a glass wool according to this invention, a fine commercial glass wool is placed in a glass tube through which is passed moist air (98% relative humidity) for 2 minutes. Vaporized methyl-chloro-silane, containing about 90% dimethyl-dichloro-silane, is passed through the tube for 15 minutes. The wool is then washed by passing therethrough a liquid comprising iso-octane and 1% by weight of water, and the wool is then removed from the tube and rinsed with methyl-ethyl ketone.

What is claimed is:

1. A process for preparing a treated glass wool of enhanced static-electricity-generating characteristics comprising applying a coating of methyl substituted polysiloxanes having about 10–1002 siloxane groups/molecule on said glass wool to render it oil-wettable, circulating through said glass wool a fluid comprising low-viscosity liquid paraffinic hydrocarbon having from five to ten carbon atoms per molecule and 0.5% to 2.0% by weight of water, until the capacity of said glass wool to generate static electricity is substantially reduced, and thereafter washing said glass wool with a solvent miscible with both oil and water.

2. A method according to claim 1 in which said polysiloxane coating is applied by immersing said glass wool in a hydrocarbon solution of said polysiloxane and then baking said glass wool for a period of not less than about ½ hour at 150°–300° C.

3. A method acording to claim 1 in which said polysiloxane coating is applied by passing through said glass wool a vapor comprising silanes selected from the group consisting of methyl-trichloro-silane, dimethyl-dichloro-silane, and trimethyl-chloro-silane.

4. A method according to claim 3 in which a moist gas is passed through said glass wool prior to treatament with the silane.

5. A method according to claim 1 in which said polysiloxane contains about 10% to 30% by weight of un-hydrolyzed chloro substituents.

6. The product produced in accordance with the method of claim 1.

7. The product produced in accordance with the method of claim 5.

8. A method according to claim 1 in which said solvent is acetone.

9. The product produced in accordance with claim 8.

(References on following page)

References Cited in the file of this patent

UNITED STATES PATENTS

| | | |
|---|---|---|
| 1,922,933 | Dirks | Aug. 15, 1933 |
| 2,148,064 | Fagerberg | Feb. 21, 1939 |
| 2,189,352 | Siegeheim | Feb. 6, 1940 |
| 2,555,607 | Robinson | June 5, 1951 |
| 2,695,367 | Van Dijck | Nov. 23, 1954 |
| 2,720,470 | Erickson | Oct. 11, 1955 |
| 2,909,190 | Wilson | Oct. 20, 1959 |

OTHER REFERENCES

The Use of Liquid Dimethylsilicones to Produce Water-Repellent Surfaces on Glass-Insulator Bodies, by O. K. Johannson and Julius J. Toroks. Proceedings of the I.R.E. and Waves of Electrons, pages 296 to 302, volume 34, May 1946.